United States Patent Office 3,293,229
Patented Dec. 20, 1966

3,293,229
STABLE, PROMOTED CATALYST SYSTEMS FOR HIGHLY CRYSTALLINE ALPHA OLEFIN POLYMERS
Isaac Levine, East Brunswick, N.J., assignor to Union Carbide Corporation, a corporation of New York
No Drawing. Filed Jan. 28, 1963, Ser. No. 254,448
9 Claims. (Cl. 260—93.7)

This invention relates to organo-metallic olefin catalyst systems characterized by exceptional retention of catalytic properties and a surprising ability to produce highly crystalline alpha-olefin polymers in high yield substantially free of wholly amorphous fractions and method for preparing such catalysts. The invention further relates to the production of highly crystalline polymers of alpha-olefinically unsaturated hydrocarbons by the low pressure process employing novel, highly stable, promoted organo-metallic olefin catalyst systems.

K. Ziegler has described the preparation of high molecular weight polymers of olefinically unsaturated hydrocarbons by contacting the monomer with a mixture of an organo-aluminum compound and a compound of a metal of groups IV–b, V–b or VI–b of the periodic table.

These catalysts have heretofore been produced by the reaction in an inert solvent medium of the organo-aluminum compound and the metal halide to form an insoluble complex as a precipitate, which is the catalyst. This precipitate is ordinarily in a finely divided condition.

These finely divided catalysts are characteristically sensitive to atmospheric contamination. In addition they appear to be inherently unstable. A typical catalyst is a hydrocarbon insoluble complex of titanium tetrachloride and triisobutyl aluminum prepared in an heptane medium. The rapid decline in catalytic activity of this typical Ziegler catalyst has been documented recently by A. Orzechowski, J. Polymer Sci., 34, 74–5 (1959). The data appearing in Table I following on yield of polyethylene after periods of aging in an inert atmosphere is taken from the Orzechowski article. The gram polymer/gram catalyst data are calculated from the Orzechowski data. Aging in each instance is the elapsed time between placing of the catalyst in the polymerization vessel and introduction of ethylene into the vessel.

TABLE I

| Catalyst age (min.) | Yield of polyethylene (g.) | Gram polymer/gram catalyst |
|---|---|---|
| 0 | 10.5 | 240 |
| 1–2 | 6.5 | 148 |
| 15 | 1.9 | 43.3 |
| 30 | 0.2 | 4.5 |
| 30 | 0.1 | 2.3 |

It can be seen from Table I that after only 1 to 2 minutes 40% of the original catalyst activity had been lost, after 15 minutes 84% had been lost and after 30 minutes 98 to 99% had been lost. These data reflect the inherent instability of conventionally prepared transition metal halide alkyl aluminum catalyst complexes in even inert atmospheres.

As a result of this poor stability, these catalysts have heretofore had to be freshly prepared for each polymerization. This, of course, is inconvenient and costly. Consequences of using partially inactivated catalyst include low yields of polymer and undesirably high concentrations of catalyst residue in the polymer obtained.

It is an object, therefore, of the present invention to provide transition metal halide organo-aluminum catalyst systems which are substantially unaffected in catalytic activity by aging for extended periods, even at elevated temperatures.

It is another object to provide method for the preparation of transition metal halide organo-aluminum catalyst systems which are substantially unaffected in catalytic activity by aging for extended periods and at elevated temperatures.

It is a further object to provide a process for the production of highly crystalline polymers of olefinically unsaturated hydrocarbons wherein high polymerization rates and minimal catalyst residues are achieved.

Heretofore, it has been known to prepare alpha-olefin polymers, described as being "highly crystalline" by contacting an alpha-olefin with catalytic amounts of a complex of a trialkyl or triaryl aluminum compound, e.g., triisobutyl aluminum or triphenyl aluminum and a lower valent transition metal halide, e.g., alpha-titanium trichloride. The crystalline content of these olefin polymers is greater than olefin polymers otherwise prepared but even these polymers are still invariably contaminated with a substantial amount, say from 5 to 50% by weight of wholly amorphous polymer, i.e., polymer which is totally devoid of any crystallinity. This grease-like polymerization product is detrimental to the overall physical properties of the so-called "highly crystalline" alpha-olefin polymer. For example, the wholly amorphous fraction will not bear a load and the mechanical properties of the polymer are thus reduced. Also, wholly amorphous polymer sweats out causing sticky, unattractive surfaces on shaped contours. Poor solvent resistance is a further consequence of the presence of a wholly amorphous fraction. Crystalline alpha-olefin polymer is essentially insoluble at temperatures below the crystalline melting temperature but wholly amorphous alpha-olefin polymers tend to be quite soluble in a great variety of organic solvents.

Removal of the wholly amorphous fraction, e.g., by extraction with diethyl ether can ameliorate these difficulties but this separation is a costly and tedious undertaking. After the amorphous fraction is removed there remains what can be termed a "residue product." This residue product, despite the extractions, has only moderate crystallinity, in fact crystallinity too low for many commercially important applications where the very highest levels of crystallinity are required, for example the spinning of fibers.

Product quality problems are not the only disadvantages accruing from polymerizations producing a wholly amorphous polymer fraction. Processing difficulties also arise. Particularly difficult are liquid phase polymerizations conducted at temperatures below the crystalline melting temperature of the polymer. In this process the product desirably is obtained as a slurry of polymer particles in the reaction vehicle and the viscosity of the reaction mass (polymer/catalyst slurry) is substantially the viscosity of the reaction vehicle. The presence of wholly amorphous polymer, however, which is readily soluble in the reaction vehicle, greatly increases the viscosity of the slurry and complicates subsequent handling operations.

It is a further object, therefore, of the present invention to provide method for producing highly crystalline alpha-olefin polymers which are substantially free of wholly amorphous fractions.

It is another object to provide transition metal-halide-organo-aluminum catalyst systems which are capable of producing highly crystalline alpha-olefin polymers substantially free of wholly amorphous fractions.

It is another object to provide transition metal halide-organo aluminum catalyst systems with improved catalytic effectiveness and unreduced ability to produce highly crystalline alpha-olefin polymers.

It is another object to provide alpha-olefin polymers substantially free of wholly amorphous fractions without post-polymerization extraction.

It is still another object to provide method for the preparation of transition metal halide-organo aluminum catalyst systems which have great stability and produce highly crystalline alpha-olefin polymers substantially free of wholly amorphous fractions.

It is still another object to achieve finely divided organo-metallic catalysts without grinding.

It has now been discovered that finely divided organo-metallic co-catalysts exhibiting high initial activity and great resistance to deterioration by aging and which produce highly crystalline alpha-olefin polymer prepared by reacting together, under continual high speed agitation providing heat producing fluid shear, a fluid transition metal halide and a fluid organo-aluminum compound to produce a super finely divided, inert liquid hydrocarbon insoluble, precipitate and then contacting the co-catalyst precipitate thus obtained with a hydrocarbon aluminum monohalide compound free of aliphatic unsaturation in an amount sufficient to render the precipitate catalytically active, are promoted i.e. improved in respect of yields of polymer provided by further reacting with up to 40 percent, based on the transition metal halide of a halogen free polyalkyl aluminum compound i.e., a trialkyl aluminum or a dialkyl aluminum hydride.

Polymers substantially free of wholly amorphous fraction are produced by contacting an alpha-olefin with the promoted, catalytically active precipitate under polymerization conditions.

Most surprisingly, the crude, unextracted alpha-olefin polymers produced with the catalyst of this invention exceed in crystallinity, melting point, and mechanical properties not only the crude alpha-olefin polymers made by conventional trialkyl aluminum-titanium trihalide catalyst but completely unexpectedly even these alpha-olefin polymers after successive extractions with diethyl ether, pentane, hexane and heptane. The prior art alpha-olefin polymers contain a practically unremovable wholly amorphous fraction which is inimical to good polymer properties. The polymers produced in this invention are substantially free of wholly amorphous polymer ab initio obviating costly extractions and providing directly a superior polymer.

The organo-metallic polymerization co-catalysts produced by the method described herein are super-finely divided precipitates consisting or highly geometrically uniform, essentially spheroidal particles. Precipitates obtained under the hereinafter set forth preferred conditions of shear producing agitation have an average particle size diameter between 200 and 500 Angstroms with no appreciable number of particles greater than 500 Angstroms in diameter. The geometry of the particles produced herein is unlike crushed or ground organo-metallic complex precipitates heretofore known which are sharp-edged and irregular. The particles obtained are rounded and essentially uniform and are, therefore, not prone to agglomeration. These particles have not been known heretofore.

A Ziegler catalyst precipitate prepared in the manner of this invention surprisingly retains catalytic properties for many days, weeks or months rather than for only a few minutes as with the same catalysts only conventionally prepared. Mere stirring type agitation or no agitation at all, such as presently practiced in the art, provides Ziegler catalysts inferior in activity, both initially and after aging, to those of this invention. For example, the catalytic life of a typical Ziegler catalyst, a reaction product of titanium tetrachloride and triisobutyl aluminum is greatly multiplied by use of the method herein described. As shown in Table I above, after only 30 minutes of aging at 50° C. the catalyst was reduced one hundred-fold in productivity from 240 to 2.3 grams polymer/gram catalyst. In contrast to this, a catalyst from these reactants under the shear agitation herein described had a productivity after 20 days of room temperature aging, (⅔ of a month at 25° C.) and then being heated at 125° C. in an inert atmosphere for 30 minutes of over 300 grams of polymer per gram catalyst. In comparison, a catalyst prepared from these components by Orzechowski had a maximum productivity of only 240 grams of polymer per gram of catalyst without any aging and this productivity declined a hundred-fold in 30 minutes.

Not only is the catalyst system described herein more stable than Ziegler catalyst systems heretofore known, but it also enables preparation of highly crystalline polymers of alpha-olefins which are substantially free of wholly amorphous fractions. These highly crystalline alpha-olefin polymers therefore are superior in mechanical properties e.g. load-bearing properties, are adapted to spinning into fibers, have exceptional solvent resistance at temperatures below their melting point temperature and do not undergo sweat-out.

The difference in wholly amorphous polymer fraction content between the alpha-olefin polymer of the prior art and the alpha-olefin polymers herein produced is pointed up by comparative extraction tests. Polypropylene prepared with a heretofore known trialkyl aluminum-alpha-titanium trichloride catalyst contains from 10 to 30% by weight of wholly amorphous polymer as determined by exhaustive extractions with boiling diethyl ether in a jacketed Soxhlet extractor. Polypropylene prepared with a hydrocarbon aluminum monohalide activated trialkyl aluminum-alpha-titanium trichloride precipitate catalyst of this invention when thus exhaustively extracted loses zero per cent to less than 2 percent by weight, which is within the experimental error inherent in the apparatus, demonstrating the substantially complete absence of a wholly amorphous fraction in the polymer.

The above data are even more significant when it is considered that the above 2 percent maximum wholly amorphous polymer fraction figure includes the amorphous portions soluble in the reaction vehicle. Inclusion of such amorphous polymer in calculating crystallinity contrasts with the normal practice in the art where the mother liquors are discarded and the thus already once extracted polymer is extracted and these last results are the ones presented to show crystallinity. Because the solubility of the wholly amorphous fractions in the reaction vehicle has been overlooked by the art and this material thrown away in the usual polymer work-up, many estimates of crystallinity have been uncritical and overly optimistic. The scale of possible error by this omission is indicated by the following.

A catalyst slurry prepared as in Example 1 below was used, except it was made at a molar ratio of triisobutyl aluminum to titanium tetrachloride of 0.755 to 1.000.

Two liters of n-heptane were dried with a stream of dry $N_2$, until the effluent gas contained 14 p.p.m. water. To this was added 30.3 millliters of a slurry containing 10.9 millimoles of titanium halide and 1.52 g. (7.6 millimoles) of triisobutyl aluminum. This mixture was aged 35 minutes at 23° C. Propylene was passed through for 4 hours at 40+3° C. at atmospheric pressure. The slurry of polymer and catalyst was quenched with 400 ml.

isopropanol and filtered. There was obtained a yield of 70.38 g. (fraction 1). Of this 54.13 g. were extracted to exhaustion with diethyl ether for 32 hours. The total weight loss was 0.45 g. or 0.89%.

The filtrate from fraction 1, was extracted with aqueous acid to remove inorganics, dried and concentrated in vacuo. There was obtained 28.8 g. of greasy residue, devoid of crystallinity, and completely amorphous by infrared measurement.

Thus this catalyst recipe polymerized propylene to solid polymer containing about 30% amorphous polymer, all but 0.89% of which is discarded in the usual workup procedures.

The agitation during reaction necessary to the practice of the method of co-catalyst preparation of this invention can be achieved with numerous combinations of vessels and agitating means known to the art. High speed impellers such as a Tri Homo Disc Mill or rotating vented cones such as a Duplex Dispersator are preferred types of agitating means. Any apparatus capable of producing fluid shear sufficient to give a heat output of at least 10 calories per minute and preferably 100 calories per minute per liter of agitated fluid in the reaction system is suitable. Preferred apparatus will accomplish the requisite calorie output rapidly by producing a higher speed fluid shear in the system. This agitation is basically simply a fluid shear. Shear is present in all agitated vessels to some degree, for example in stirred reactors although the reaction mass rotates with the agitating means, some shearing occurs at the interface of the vessel wall and the moving reaction mass. This is not a fluid shear. To obtain fluid shear it is essential to provide an agitation pattern in a fluid mass such that portions of the mass are in frictional, sliding contact with other portions of the mass. "Fluid shear" as used herein refers to this internal sliding fractional contact between like liquid masses as distinguished from external sliding frictional contact between unlike masses i.e., vessel walls and reaction mass. The inevitable incident of shear is friction and this means production of heat. A convenient index of the quality of shear or the degree of friction being obtained is the amount of heat produced. It is to be emphasized that the preparation of the co-catalyst and the practice of the method of this invention is no wise dependent upon some critical temperature being achieved in the reaction vessel. Rather the heat differential induced by shear agitation in the reaction vessel between the start of the reaction and the end of reaction is what is important. The desirable catalyst products described above are produced when the agitation in the reaction vessel is sufficient to give an output of 10 calories per minute per liter of agitated fluid. Calorie output is easily determined by multiplying the heat rise obtained in the particular agitated fluid, e.g. the reaction solvent, times the volume and times the specific heat thereof. Since the reaction to form the co-catalyst is exothermic, it is best to ascertain prior to carrying out co-catalyst preparation whether a particular vessel and agitating system will produce sufficient shear, e.g. by agitating the proposed reaction solvent only. Then, having established that minimum shear at least is obtained in a particular vessel, co-catalyst preparation can be carried out without constant measurement of shear development.

Alternatively, quality and quantity of shear can be compared with a bench mark of a 5° C. rise at steady state over ambient temperature obtained when agitating 500 milliliters of heptane in an insulated vessel under substantially adiabatic conditions.

As pointed out above, fluid shear is essential to the present method of co-catalyst preparation. Therefore the co-catalyst reactants, the transition metal halide and the organo-aluminum compound, must both be in the fluid state. Thus, reaction can be effected where the reactants are gaseous fluids or liquid fluids. Liquid fluidity is preferred for convenience in handling the reactants and the product. Liquid fluidity is achieved by using normally liquid reactants (i.e. at room temperature) or by dissolving normally solid reactants in a suitable inert organic solvent or mixture of solvents such as are well known in the art, for example those disclosed in U.S.P. 3,032,511 issued May 1, 1962, to A. W. Langer et al. The two reactants can be dissolved in the same or different solvents. One reactant can be placed in the reaction vessel as a solution and the other can be in the undissolved but liquid state.

It is preferred to dissolve the reactants whether they be liquids or not in an inert organic liquid selected from the class of aromatic and saturated hydrocarbons and halogenated aromatic hydrocarbons which are solvents for the reactants but which do not dissolve the reaction product. Specific classes of such solvents include saturated aliphatic and alicyclic hydrocarbons such as alkanes and cycloalkanes e.g. heptane and cyclohexane, aromatically unsaturated hydrocarbons, such as benzene, alkyl substituted aromatically unsaturated hydrocarbons such as toluene, and halogen substituted aromatically unsaturated hydrocarbons, such as dichlorobenzene.

As the transition metal halide there can be used in this invention compounds having the formula $$MO_aX_b$$

wherein M is a transition metal selected from groups IV–b, V–b or VI–b of the Deming periodic table (Handbook of Chemistry and Physics, 30th ed., page 312) for example, Ti, Zr, Hf, V, Ni, Ta, Cr, Mo, and W; and having a valence $z$ greater than III in the compound $MO_aX_b$; O is oxygen and X is a halogen; $b$ is an integer having a value of from 2 to $z$; and $a$ is an integer equal to $z-b/2$ and has a value of 0 or greater. Thus the term "transition metal halide" as used herein includes metal halides and metal oxyhalides. Particularly desirable metal compounds in this invention are titanium tetrachloride, vanadium oxychloride and chromium oxychloride.

The catalysts of this invention are the result of essentially a three stage preparation. In the first stage, the transition metal halide is reduced from its initial valence to a lower valence. This reduction effects a change in the transition metal halide from soluble to insoluble in the reaction medium and high shear agitation as above described is essential throughout. Because the primary chemical effect of this stage is a reduction in valence, the particular organo-aluminum compound is not critical and can be one or more of the compounds having the formula $$AlR_mY_{3-m}$$

wherein R is a hydrocarbon radical free of aliphatic unsaturation such as alkyl e.g. ethyl propyl, and butyl, or aryl e.g. phenyl; $m$ is a number greater than zero and not more than 3; and Y is a halogen i.e. a fluoro, chloro, bromo or iodo group.

The proportions of the compound $MO_aX_b$ and $AlR_mY_{3-m}$ in the first stage are not narrowly critical. As a minimum there should be used a sufficient amount of the aluminum compound to reduce the valence of substantially all the atoms of the transition metal, M, to less than IV and preferably to III. The amount employed where at least a minimum is present is not critical to the invention.

It will be noted from the above-given description of the compound $MO_aX_b$ the valence of M, there termed "z" was "greater than III" in the compound $MO_aX_b$. Valence of M in any specific compound will of course be an integer but it is contemplated in this invention that mixtures of more than one metal halide or mixtures of metal halides wherein the metal exists in different valence states in the two compounds can be used provided the average valence for the transition metal is greater than III.

Where there is but one metal halide present to react with the organo-aluminum compound the term z will equal IV or more. Average valence of the transition metal in a particular reaction system can be calculated from the data provided an analysis of the reaction system according to the method of E. G. Tabakova and Z. V. Soloveva, Zavodskaya Lab., 22, No. 12, 1417 (1956).

The quantity of aluminum compound necessary to reduce the valence state of substantially all transition metal atoms to less than IV is in the first instance dependent on the number of transition metal reactive groups i.e. hydrocarbon groups bound to the aluminum. For that reason it is usual to consider the "hydrocarbon equivalents" of the aluminum compound rather than moles of aluminum compound in calculating proportions of catalyst reactants. It is easily seen that triethyl aluminum has 3 hydrocarbon equivalents, diethyl aluminum monochloride 2 hydrocarbon equivalents and so forth.

As stated, in carrying out the first stage of the catalyst preparation, wherein the co-catalyst is prepared it is essential to reduce the valence of substantially all the atoms of metal M to less than IV. The reaction of the hydrocarbon aluminum compound with the transition metal halide proceeds by first reducing the valence of the transition metal from its valence in the compound $MO_aX_b$ (z in the formula above) to III. When the valence is at III the transition metal halide precipitates and the reaction mixture becomes two phase. For the first stage reaction to valence III, there is used one hydrocarbon equivalent for each valence above III. Thus, for example, to reduce $TiCl_4$ to $TiCl_3$ one hydrocarbon equivalent is added, reducing the valence of Ti from IV to III. Similarly where M has a valence of V, e.g. V in $VOCl_3$, 2 hydrocarbon equivalents is sufficient. And where M has a valence of VI, e.g. Cr in $CrO_2Cl_2$, 3 hydrocarbon equivalents is sufficient.

Use of excessive amounts of aluminum compound results in overreduction of the transition metal, ultimately to the metal itself. In general, a maximum of 30 equivalents of hydrocarbon per equivalent (i.e. mole) of metal halide should be observed. Very careful reaction and closely controlled low temperatures are necessary to avoid overreduction when using greater than 30 equivalents of hydrocarbon per equivalent of metal. Where reaction temperature is above 100° C. it is desirable to lower the number of hydrocarbon equivalents below 30 progressively as temperatures used rise above 100° C.

In the second stage of the catalyst preparation the insoluble lower valent transition metal halide co-catalyst resulting from the first step is rendered catalytically active by contacting with additional amounts of certain organo-aluminum compounds. It is this contacting stage which is absolutely essential to the obtaining of highly crystalline alpha-olefin polymers.

Although a wide variety of co-catalysts are taught in the art for this catalytic activation, it is only with a particular class of organo-aluminum compounds that the catalysts are capable of producing the very highest crystalline content polyolefins substantially completely free of wholly amorphous fraction can be prepared.

The members of this class are hydrocarbon aluminum monohalides free of aliphatic unsaturation. These compounds have the general formula $$Al(R_h)_2G$$

wherein $R_h$ is a hydrocarbon radical free of aliphatic unsaturation such as alkyl e.g. preferably having from 1 to 10 carbon atoms, methyl, ethyl, propyl isopropyl, butyl, isobutyl, decyl and the like; aryl e.g. phenyl, alkaryl and aralkyl, preferably having from 6 to 10 carbon atoms e.g. phenylethyl, tolyl, xylyl and the like; and G is a halogen, i.e. a fluoro, bromo, iodo, and preferably a chloro group.

Ratios of hydrocarbon aluminum monohalide to transition metal halide are not narrowly critical because the III valence state metal compounds are solids and only a small percent of the solid particles is composed of metal atoms; and of these metal atoms only a portion thereof are on the surface. Only enough hydrocarbon aluminum monohalide to activate these metal atoms is necessary. A wide range of ratios is shown in Table II. As is there shown as low a ratio as 2.15:1 of diethyl aluminum chloride to transition metal halide provides III valent metal containing catalysts. A ratio of 0.07:1 can be used with success as well.

TABLE II

| Concentration $Et_2AlCl$* m. moles/liter | Mole Ratio: $Et_2AlCl:TiCl_3$ | Polymer Productivity g./m. mole $TiCl_3$ | Percent Amorphous | Intrinsic Viscosity | Catalyst Age, days |
|---|---|---|---|---|---|
| 15.4 | 2.15:1 | 0.762 | 0.86 | 4.87 | 47 |
| 17.4 | 2.65:1 | 0.845 | 0.00 | 7.73 | 50 |
| 26.6 | 3.95:1 | 1.25 | 0.56 | 6.70 | 59 |
| 27.2 | 4.22:1 | 1.20 | 0.12 | 5.55 | 60 |
| 41.2 | 6.03:1 | 1.67 | 1.17 | 4.74 | 53 |
| 42.0 | 6.34:1 | 1.72 | | | 54 |
| 66 | 9.80:1 | 2.48 | 1.17 | 9.18 | 52 |
| 65.8 | 9.92:1 | 2.26 | 1.04 | 7.11 | 51 |
| 68.5 | 10.33:1 | 2.52 | 1.67 | 6.06 | 60 |
| 103 | 16.05:1 | 3.35 | 0.85 | | 61 |
| 136.5 | 20.05:1 | 4.04 | | | 65 |
| 167.5 | 25.28:1 | 4.83 | 1.56 | | 66 |
| 195 | 28.88:1 | 5.45 | | | 67 |
| 200 | 29.35:1 | 5.35 | 1.29 | | 68 |
| 329 | 48.9:1 | 8.49 | 2.47 | | 70 |

*$Et_2AlCl$ is diethyl aluminum chloride.

In the third stage of the catalyst preparation, which is the subject of the present invention the rate of polymerization obtainable with the just described catalyst is further enhanced without sacrificing polymer crystallinity or increasing the wholly amorphous ether soluble fraction, by the simultaneous use of critical amounts, based on the transition metal halide, or halogen-free polyalkyl aluminum compounds, e.g. triethyl, tri-n-propyl, triisopropyl, triisobutyl, trihexyl, or tricyclohexyl aluminum as well as diisobutyl aluminum hydride and the like.

These promoters, used in up to certain amounts, increase the polymerization rate without either the simultaneous formation of wholly amorphous, ether soluble polymer which as above indicated is normally associated with halogen-free polyalkyl compounds or a lessening of the overall crystallinity of the polymer. Particularly, the use of up to 40 mole percent i.e. from as low as 0.01 to 40 mole percent and preferably from 5 to 30 mole percent of a halogen-free polyalkyl aluminum compound such as listed above, based on the transition metal halide, provides increased polymerization rates. Use of greater than these amounts increases amorphous polymer formation, without a justifiable improvement in the rate of polymerization. This is demonstrated by the data in Table III.

TABLE III

| Et2AlCl[1] m. mole | Et3Al,[2] m. mole | I-Bu2AlH,[3] m. mole | TiCl3 m. mole | G. polymer m. mole Ti | Percent ether solubles |
|---|---|---|---|---|---|
| 1.09 | 0 | 0 | 2.0 | 4.97 | 0 |
| 1.90 | 0 | 0 | 2.0 | 5.70 | 1.8 |
| 11.0 | 0 | 0 | 2.0 | 6.70 | 1.0 |
| 0.749 | 0.328 | 0 | 2.0 | 5.66 | 0.1 |
| 1.83 | 0.240 | 0 | 2.0 | 6.50 | 1.2 |
| 11.4 | 0 | 2.78 | 2.0 | 15.2 | 16.2 |
| 10.4 | 0 | 0.282 | 2.0 | 7.25 | 1.0 |
| 10.1 | 0 | 0.530 | 2.0 | 7.65 | 2.0 |

[1] Et2AlCl is diethyl aluminum chloride.
[2] Et3Al is triethyl aluminum.
[3] I-Bu2AlH is diisobutyl aluminum hydride.

The catalyst componts in the first two stages can be added to the reaction zone in any order. In continuous reaction systems independent streams, one of each of the components, can be advantageously fed into one end of the agitating-reacting zone. Rate of addition and contact times are not critical with contact times ranging from, for example, 30 seconds to 2 hours having been successfully used. Portions of one or the other of the catalyst components can be added to the whole of the other catalyst component. A highly convenient manner of addition of the hydrocarbon aluminum halide is with the alpha-olefin to be polymerized.

The temperature at which the catalyst preparation, first and second stage, is conducted is not critical in the method of this invention. Generally speaking, the reaction can be effected at temperatures ranging from 0° C. to 200° C., and particularly 25 to 175° C. but temperatures higher or lower can be employed with success. It is preferred to conduct at least a portion of the reaction at temperatures over 100° C., to ensure complete utilization of the organo-aluminum compound.

The use of pressure is not required, except to keep liquid a volatile reaction solvent at elevated reaction temperatures, and will not ordinarily be used, since numerous organic solvents which are liquid at elevated temperatures are readily available.

In the practice of a preferred embodiment of the present invention in the first stage of the method a solution of a lower alkyl aluminum compound e.g. tri-n-propyl or triisobutyl aluminum or diisobutyl aluminum chloride in n-heptane or n-decane is added dropwise over the course of about an hour to a high shear agitated solution of either titanium tetrachloride or vanadium oxychloride in the same solvent until there is a molar ratio of aluminum alkyl to transition metal halide of from 0.3:1 to 0.5:1. Bulk temperature is permitted to rise uncontrolled during the first stage. Concentration of the components in their respective solutions and the reaction mixture are in no way critical. Convenience in handling is the determining factor.

The solution is then further agitated in a suitable apparatus, that is, an apparatus demonstrated to be capable of imparting sufficient motion to the reaction solution that the resulting fluid turbulent shear produces heat at a preferred rate of at least 100 caloried per minute per liter of solvent. Preferred devices include a Duplex Dispersator especially in a baffled vessel, a Tri Homo Disc Mill and a Colloid Mill. Agitation with a high shear is continued for about an hour.

In the second stage the reaction slurry from above is heated to a temperature above 100° C. an preferably above about 150° C. for from 15 minutes to 600 minutes, preferably about 60 minutes. The mixture is then cooled to below 60° C. if necessary, prior to the addition of hydrocarbon aluminum halide to avoid excessive reduction of the transition metal halide.

The preferred molar ratio of hydrocarbon aluminum halide to transition metal halide is from 0.1:1 to 100:1.

In the third stage a halogen-free polyalkyl is added to bring the amount thereof present to a maximum of 40 mole percent based on the transition metal halide. The catalyst suspension thereby produced is removed under an inert atmosphere.

Under certain conditions, the use of aliphatic straight chain hydrocarbon aluminum compounds for the first stage of the catalyst preparation may produce by-products which reduce catalyst efficiency, but without changing the structure of the resulting polymers. It is, therefore, preferred that when catalysts of maximum effectiveness are desired, that the hydrocarbon aluminum compounds contain only hydrocarbon groups having branches on the alpha or beta carbon atom. For example, under conditions conducive to by-product formation catalysts from triisobutyl aluminum are to be preferred over catalysts from triethyl aluminum.

Catalysts prepared in accordance with the method of this invention are superior for the polymerization of alpha-olefinically unsaturated hydrocarbons heretofore polymerized with Ziegler catalysts, especially those which have the general formula $$R_o\text{—}CH{=}CH_2$$

wherein $R_o$ is a saturated aliphatic, alicyclic or an aromatic radical, alone or in mixture with one another.

The practice of the present invention is illustrated by the following examples which are not intended to be nor should they be construed as limitative of the invention. All parts and percentages are by weight unless otherwise stated.

The apparatus used in the examples were tested for adequate shear capacity by introducing 500 milliliters of heptane thereinto and agitating as if during catalyst preparation. Temperature rise was recorded at various intervals. The apparatus used in Example 1 had a calorie output rate of 100 calories per minute per liter.

EXAMPLE 1

*Catalyst preparation, first stage*

Pure n-decane was dried with nitrogen until the effluent nitrogen contained less than 2 parts per million of water. To a 475.03 gram portion of the n-decane there was added 74.50 grams of C.P. grade titanium tetrachloride and the solution blown under dry nitrogen into a dried one liter baffled resin kettle. The kettle was fitted with 3″ Duplex Dispersator, a dropping funnel, thermometer, nitrogen source, and reflux condenser. The Dispersator was driven at 2,000 r.p.m. and a solution of 27.46 grams of triisobutyl aluminum in 78.12 grams of n-decane was added dropwise over a period of 28 minutes. External cooling was provided to maintain the temperature between 25° C. and 30° C. during this period. The resulting slurry was agitated an additional 60 minutes at 30° C. with external cooling. The resulting suspension was heated to 155° C. within 15 minutes. In another 15 minutes the temperature was 165° C. Heating was continued for an additional 90 minutes at 174° C. The suspension resulting was cooled in 50 minutes to 44° C. and the precipitate was removed in vacuo in an atmosphere of nitrogen. The product weighed 735.4 grams, had a density of 0.785 gram/milliliter and a nominal triisobutyl aluminum to titanium tetrachloride ratio of 0.35:1.

*Catalyst preparation, second stage*

1500 ml. of ASTM grade n-heptane was dried to 3 parts per million of water in the effluent by a nitrogen and propylene purge. There was added to the heptane 1.92 grams diethyl aluminum chloride (15.92 millimoles). There was then added 9.40 grams of the suspension obtained above (5.02 millimoles of titanium halide), to form an activated catalyst.

*Polymerization of propylene, using a promoter*

Fifteen hundred milliliters of ASTM grade n-heptane was dried to 1.5 parts of water in the effluent by a nitrogen and propylene purge. There was added 1.87 grams diethyl aluminum chloride (15.5 millimoles); there was then added 9.82 grams of the suspension produced above (5.24 millimoles of titanium halide). Propylene was passed to the mixture for 15 minutes at 40° C. and 8 p.s.i. gauge pressure. Thereupon there was added 0.8 millimole of triethyl aluminum as a dilute solution in heptane. Addition of propylene was continued for a total reaction time of 2.5 hours. At the end of this period, the reaction mixture was quenched with 200 milliliters of isopropanol and the whole poured into an additional 1500 milliters of an equivolume mixture of methanol and isopropanol. The polymer precipitate was filtered and dried to constant weight. Yield of polymer was 39.5 grams per millimole of titanium halide. The filtrate was washed with 10 percent aqueous HCl neutralized with water, dried and concentrated in vacuo.

The filtrate, contained less than 100 milligrams of nonvolatiles. The polymer was extracted with diethyl ether to exhaustion. Percent solubles was 0.125%.

EXAMPLE 2

Fifteen hundred milliliters of ASTM grade n-heptane was dried to 1.5 parts per million of water in the effluent by a nitrogen and propylene purge. There was added 1.99 grams diethyl aluminum chloride (16.5 millimoles); there was then added 9.80 grams (5.23 millimoles of titanium halide) of the suspension prepared in Example 1. Propylene was passed into the mixture at 40° C. and 8 p.s.i. gauge pressure for 15 minutes. Thereupon, there was added 1.49 millimoles of triethyl aluminum as a dilute solution in n-heptane. Addition of propylene was continued for a total reaction time of 2.5 hours. The polymer was worked up as in Example 1. Yield was 48.3 grams of polypropylene, equal to 9.24 grams of polymer per millimole of titanium halide. The filtrate contained less than 100 millimoles of nonvolatiles. The polymer was extracted with diethyl ether as in Example 1. Percent ether solubles was 0.36%.

Too great a quantity of trialkyl aluminum compound can result in excessive high presence of ether soluble wholly amorphous polymer. For example, in the following two experiments amounts of triethyl aluminum in excess of those herein described as effective for promoting catalytic activity are shown to increase yields but too high levels of a wholly amorphous polymer fraction result.

*Experiment.*—Example 1 was duplicated but employing 1.86 grams of diethyl aluminum chloride (15.4 millimoles) and 9.73 grams (5.20 millimoles of titanium halide) of the suspension prepared in Example 1. Propylene was passed into the mixture at 40° C. and 8 p.s.i. gauge pressure for 15 minutes. Thereupon 2.95 millimoles of triethyl aluminum was added as dilute solution in n-heptane. Addition of propylene was continued for a total reaction time of 2.5 hours. The polymer was worked up as in Example 1. Yield was 61.8 grams of polymer equal to 11.8 grams polymer per millimole of titanium halide. The filtrate contained less than 100 milligrams of nonvolatiles. The polymer was extracted with diethyl ether as in Example 1. Weight loss was 7.27%.

*Experiment 2.*—Fifteen hundred milliliters of ASTM grade n-heptane was dried to 1.5 million of water in the effluent by a nitrogen and propylene purge. There was added 2.37 grams of diethyl aluminum chloride (19.68 millimoles). There was then added 10.87 grams (5.8 millimoles of titanium halide) of the suspension prepared in Example 1. Propylene was passed into the mixture at 40° C. and 8 p.s.i. gauge pressure for 15 minutes. Thereupon 65 millimoles of triethyl aluminum was added. Addition of propylene was continued for a total reaction time of 2.5 hours. Yield was 75.55 grams of polypropylene, equal to 13 grams of polymer per millimole of titanium halide. The polymer was tested for diethyl ether solubles as in Example 1. Percent ether solubles was 10.6%.

EXAMPLE 3

*Polymerization of butene-1*

Using the promoted catalyst of Example 1, polymerization of butene-1 is carried out by passing butene-1 gas at 40° C. and 8 p.s.i.g. into the n-decane/catalyst mixture for 2.5 hours At the end of this period the mixture is quenched with 200 ml. of isopropanol and the whole is poured into an additional 1500 ml. of an equi-volume mixture of methanol and isopropanol. The polymer precipitate is filtered and dried to constant weight. Yield is 27.34 grams, equal to 5.45 g. of polymer per millimole of titanium halide. The filtrate is washed with 10% aqueous HCl, neutralized with water and dried and concentrated in vacuo. Nonvolatiles in the filtrate or residue is less than 100 mg., indicating substantially absence of any quenched, reaction which soluble, wholly amorphous fraction in the polymer. The dried polymer is extracted with diethyl ether to exhaustion. Percent ether solubles is 1.9%. The crystalline melting point by disappearance of birefringence is 125–126° C.

It is further characteristic of the catalysts described above, that they produce "living alpha-olefin polymers." For example, the titanium halide-Et$_2$AlCl combination polymerizes propylene in such a manner that the polymer chain remains permanently attached to the catalyst site until the catalyst is destroyed by quenching.

This property, together with the retention of catalytic activity makes these catalysts ideal for preparing non-random, block copolymers of alpha-olefins with other polymerizable alpha olefins. These copolymers have been prepared from ethylene and propylene, propylene and styrene, alpha-butene and 4-methylpentene-1, hexene-1 and p-chloro-styrene, and ethylene and 4-methylpentene-1. Primarily these polymers can be differentiated from graft block copolymers by the fact that each of the homopolymer segments have been produced stereospecifically, and is therefore crystallizable.

What is claimed is:

1. In the method for the preparation of highly geometrically uniform, essentially spheroidal particulate organo-metallic catalysts from (A) transition metal halides having the formula $$MO_aX_b$$

wherein M is a transition metal selected from the class consisting of metals of groups IV–b, V–b, and VI–b of the Deming periodic table having a valence $z$ greater than 3 in the compound $MO_aX_b$; O is oxygen and X is a halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, m is a number greater than zero and not more than 3, and Y is a halogen, which comprises contacting said metal halide reactant with a sufficient amount of said organo-aluminum compound reactant to reduce the valence of at least a portion of M to III, while both reactants are dissolved in a reaction medium comprising an inert organic solvent therefor which is not a solvent for their reaction product, and throughout the contacting step subjecting the reactants to continual high speed agitation in a pattern characterized by internal fluid shear which is sufficient to produce at least 10 calories per minute per liter of agitated fluid and precipitating the reaction product from the reaction medium, the improvement which comprises contacting the precipitate with a hydrocarbon aluminum monohalide compound free of aliphatic unsaturation in a molar ratio of said hydrocarbon aluminum monohalide to said transition metal halide of from 0.1:1 to 100:1 and from 0.01 to 40 mole percent based on the transition metal halide of a halogen free polyalkyl aluminum compound.

2. In the method for the preparation of highly geometrically uniform, essentially spheroidal particulate organo-metallic catalysts from
(A) transition metal halides having the formula $$MO_aX_b$$

wherein M is a transition metal selected from the class consisting of metals of groups, IV–b, V–b, and VI–b or the Deming periodic table having a valence z greater than 3 in the compound $MO_aX_b$; O is oxygen and X is a halogen; b is an integer having a value of 2 to z and a is an integer equal to z—b/2 and has a value of at least zero and,
(B) an organo-aluminum compound having the formula $$AlR_mY_{3-m}$$

wherein R is a hydrocarbon group free of aliphatic unsaturation, m is a number greater than zero and not more than 3, and Y is a halogen which comprises contacting said metal halide reactant with a sufficient amount of said organo-aluminum compound reactant to reduce the valence of at least a portion of M to III, while both reactants are dissolved in a reaction medium comprising an inert organic solvent therefor which is not a solvent for their reaction product, and throughout the contacting step subjecting the reactants to continual high speed agitation in a pattern characterized by internal fluid shear which is sufficient to produce at least 10 calories per minute per liter of agitated fluid and precipitating the reaction product from the reaction medium, the improvement which comprises contacting the precipitate with a hydrocarbon aluminum monohalide compound free of aliphatic unsaturation in a molar ratio of said hydrocarbon aluminum monohalide to said transition metal halide of from 0.1:1 to 100:1 and from 5 to 35 mole percent based on the transition metal halide of a halogen-free polyalkyl aluminum compound.

3. Method claimed in claim 2 wherein the transition metal halide is titanium tetrachloride, the organo-aluminum compound is triisobutyl aluminum and the hydrocarbon aluminum monohalide is diethyl aluminum chloride.

4. A highly geometrically uniform essentially spheroidal particulate, rounded organo-metallic catalyst which is resistant to agglomeration and free of sharp edges and irregular contours and which has an average particle size diameter between 200 and 300 Angstroms and no appreciable number of particles exceeding 500 Angstroms, said catalyst being the reaction product of co-catalyst comprising the reaction product of
(A) a transition metal halide having the formula $$MO_aX_b$$

wherein M is a transition metal selected from the class consisting of metals of groups IV–b, and V–b and VI–b of the Deming periodic table having a valence z greater than 3 in the compound $MO_aX_b$; O is oxygen and X is a halogen; b is an integer having a value of 2 to z and a is an integer equal to z—b/2 and has a value of at least zero, and
(B) an organo-aluminum compound having the formula $$AlR_mY_{3-m}$$

wherein R is a hydrocarbon group free of aliphatic unsaturation, m is a number greater than zero and not more than 3, and Y is a halogen, and a catalytically activating amount of a hydrocarbon aluminum monohalide compound free of aliphatic unsaturation and from 0.01 to 40 mole percent, based on the transition metal halide of a halogen-free polyalkyl aluminum compound.

5. The organo-metallic catalyst claimed in claim 4 wherein the transition metal halide is titanium tetrachloride, the organo-aluminum compound is triisobutyl aluminum and the hydrocarbon aluminum monohalide is diethyl aluminum chloride.

6. The organo-metallic catalyst claimed in claim 4 wherein the transition metal halide is vanadium oxychloride the organo-aluminum compound is triisobutyl aluminum and the hydrocarbon aluminum monohalide is diethyl aluminum chloride.

7. The organo-metallic catalyst claimed in claim 4 wherein there is used from 5 to 35 mole percent of diisobutyl aluminum hydride as the halogen free polyalkyl aluminum compound.

8. Method for polymerizing olefinically unsaturated hydrocarbon monomers having the formula $$R_o-CH=CH_2$$

wherein $R_o$ is member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from a co-catalyst comprising the fluid shear reaction product of
(A) transition metal halides having the formula $$MO_aX_b$$

wherein M is a transition metal selected from the class consisting of metals of groups IV–b, and V–b and VI–b of the Deming periodic table having a valence z greater than 3 in the compound $MO_aX_b$; O is oxygen and X is a halogen; b is an integer having a value of 2 to z and a is an integer equal to z—b/2 and has a value of at least zero, and
(B) an organo-aluminum compound having the formula $$AlR_mY_{3-m}$$

wherein R is a hydrocarbon group free of aliphatic unsaturation, m is a number greater than zero and not more than 3, and Y is a halogen, and a catalytically activating amount of a hydrocarbon aluminum monohalide compound free of aliphatic unsaturation and from 0.01 to 40 mole percent, based on the transition metal halide, of a halogen free polyalkyl aluminum compound.

9. Method for polymerizing olefinically unsaturated hydrocarbon monomers having the formula $$R_o-CH=CH_2$$

wherein $R_o$ is a member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from a co-catalyst comprising the fluid shear reaction product of (A) transition metal halides having the formula $$MO_aX_b$$

wherein M is a transition metal selected from the class consisting of metals of groups IV–b, V–b, and VI–b of the Deming periodic table having a valence $z$ greater than 3 in the compound $MO_aX_b$; O is oxygen and X is a halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, and a catalytically activating amount of a hydrocarbon aluminum monohalide compound free of aliphatic unsaturation and from 5 to 35 mole percent, based on the transition metal halide of a halogen free polyalkyl aluminum compound.

References Cited by the Examiner

UNITED STATES PATENTS 2,909,510  10/1959  Thomas _____ 260—94.9
2,943,063  6/1960  Eby _____ 260—94.9

JOSEPH L. SCHOFER, *Primary Examiner.*

F. L. DENSON, *Assistant Examiner.*